UNITED STATES PATENT OFFICE.

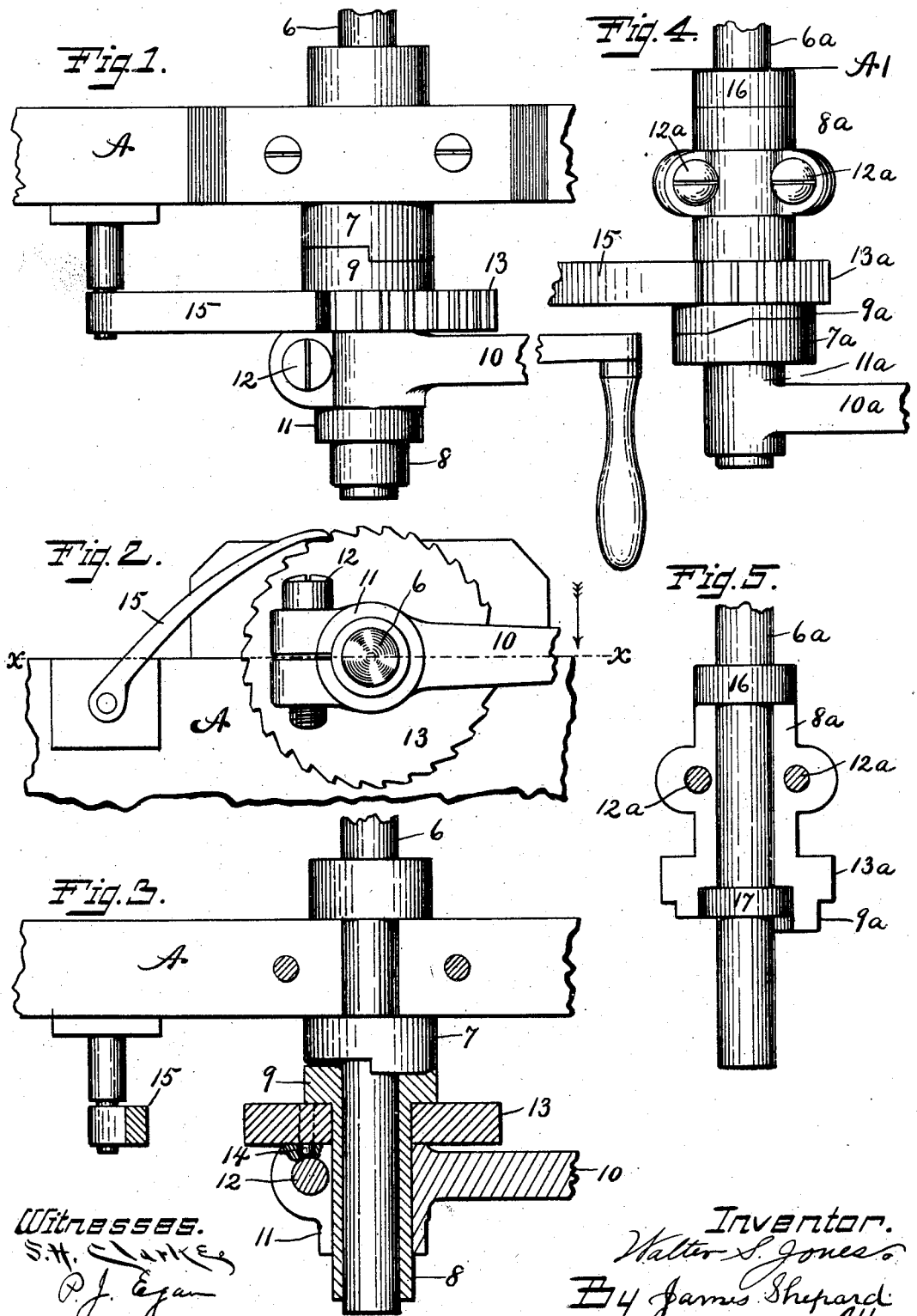

WALTER S. JONES, OF PLAINVILLE, CONNECTICUT.

SAFETY-CLUTCH FOR STARTING GAS-ENGINES.

No. 896,451.   Specification of Letters Patent.   Patented Aug. 18, 1908.

Application filed August 30, 1905. Serial No. 276,464.

*To all whom it may concern:*

Be it known that I, WALTER S. JONES, a citizen of Great Britain, residing at Plainville, in the county of Hartford and State of Connecticut, have invented certain new and useful Improvements in Safety-Clutches for Starting Gas-Engines, of which the following is a specification.

My invention relates to improvements in safety clutches for the starting devices of gas, gasolene, oil, combustion or explosive engines, or motors and the object of my improvement is to provide a frictional device for starting the motor which will allow the motor to revolve backward without any backward movement of the crank, and to thereby protect the operator from injury.

In the accompanying drawings:—Figure 1 is a broken plan view of my safety clutch, together with so much of a motor as is deemed necessary to show its connection therewith. Fig. 2 is a side elevation thereof. Fig. 3 is a sectional plan view of the same on the line $x,x$ of Fig. 2, with a small portion sectioned on a lower plane. Fig. 4 is a plan view illustrating my safety clutch in a modified form. Fig. 5 is a sectional plan of parts of the same, the plane of section extending centrally and horizontally through the axis of the clutch.

A, designates a portion of a frame within which one end of the starting or motor shaft 6 is mounted in any ordinary manner. This shaft is the one that is turned to start the engine or motor. It is turned in the direction intended for the said shaft in driving the engine forwardly. In some cases, the engine or motor may start suddenly backwards with great force, in which case the operator may lose control of the starting crank and be injured thereby.

Upon the outer end of the shaft 6 a clutch member 7 is rigidly formed or affixed so as to rotate with the said shaft. Loosely mounted on the same shaft or so as to be slipped thereon when desired, is a sleeve 8 bearing the companion clutch member 9 at its inner end. The periphery of this sleeve constitutes a cylindical friction surface for rotating the shaft forwardly. A crank 10, illustrated as broken off, is provided with a yielding split hub 11 and adjusting or clamp screw 12, and is mounted on the said sleeve so as to be held thereon by friction and to drive the said sleeve with it until the resistance to the forward motion of the sleeve overcomes the friction of the crank hub on the said sleeve. This crank hub constitutes a tubular friction device which is mounted on the aforesaid cylindrical friction surface. The said sleeve 8 has also mounted thereon a ratchet wheel 13 that lies between the crank hub and clutch member 9. This ratchet wheel should be so connected with the crank hub as to necessarily rotate therewith. This may be accomplished in any ordinary manner, as for example by means of a pin 14 on one part let into a socket on the other part, as shown in Fig. 3. A pawl 15 is pivoted on the frame A for engaging the ratchet wheel in the ordinary manner.

In order to start the engine the crank with connected sleeve, ratchet wheel, and clutch member, is slipped upon the outer end of the shaft 6, far enough to bring the clutch members into engagement as shown in Fig. 1. By means of the adjusting or clamping screw 2, the friction of the crank hub on the sleeve may be so adjusted that turning the crank in the proper direction will also turn the sleeve and clutch so as to drive the starting shaft 6 and start the engine. The crank and connected parts may be removed and the engine permitted to run as long as may be desired. If however, instead of the engine being started in the proper direction, the engine should suddenly start in the reverse direction when the clutch is in gear, a backward movement of the crank will be prevented by the pawl which will hold the ratchet wheel and connected crank from moving backwardly while the friction connection of the crank hub and sleeve will permit the shaft, the clutch, and the sleeve, to turn backwardly within the crank hub while the crank is thus held against such backward movement, whereby the operator is not liable to be hit or injured by a backwardly moving crank.

In the modification, Figs. 4 and 5, the side of the frame is indicated by the line $A^1$, Fig. 4. The shaft $6^a$ is the starting shaft having collars 16 and 17. Between these collars on the said shaft, a split or two-part sleeve $8^a$ is mounted, having a clutch member $9^a$ and ratchet wheel $13^a$ both formed integral with the two parts of the said sleeve. The crank $10^a$ and crank hub $11^a$ are formed integral with the companion clutch member $7^a$ and may be slipped loosely on or off the shaft $6^a$ as shown respectively in Figs. 4 and 5. The two parts of the combined sleeve, clutch member, and ratchet wheel, are held together on the shaft 6ª by means of screws 12ª which also serve to adjust the friction of the said sleeve on the shaft. In this modification, that portion of the starting shaft that is between the collars 16 and 17 is the cylindrical friction surface for rotating forwardly with the crank, and the two part sleeve is the tubular friction device that is mounted thereon. The ratchet wheel is held against moving backwardly by means of the pawl 15 as in the construction first described. The operation of this modified construction is the same as that of the construction first described, only the slipping to permit the backward movement of the starting shaft is between the shaft and the sleeve, instead of between the crank-hub and sleeve. While the ratchet wheel and pawl are very desirable, it is evident that the shaft would rotate backwardly in the friction devices if the crank was held firmly by hand.

It is apparent that some changes from the specific construction herein disclosed may be made and therefore I do not wish to be understood as limiting myself to the precise form of construction shown and described, but desire the liberty to make such changes, in working my invention as may fairly come within the spirit and scope of the same.

I claim as my invention:—

1. In a starting device for motors, the combination of a starting shaft with a pair of clutch members for driving the said shaft forwardly, a starting crank connected with one of the said clutch members, a cylindrical friction surface for rotating forwardly with the said shaft, a tubular friction device mounted on the said cylindrical friction surface for carrying the shaft forwardly with the crank against a given load and then permitting the shaft to stop or turn backwardly without the crank, and means for continually binding the said tubular friction device upon the said cylindrical friction surface, to regulate the degree of friction that is constantly exerted thereby.

2. In a starting device for motors, the combination of a starting shaft with a two part clutch, a sleeve with one part of the said clutch connected therewith, a crank having a split hub mounted on the said sleeve in frictional contact therewith, means for adjusting the degree of friction between the said hub and sleeve, a ratchet wheel rigidly connected with the said split hub of the crank and a pawl acting on the said ratchet wheel to hold the said split hub against moving backwardly during a backward motion of the said shaft and sleeve.

WALTER S. JONES.

Witnesses:
JAMES SHEPARD,
SHEFFIELD H. CLARKE.